(12) United States Patent
Oshikiri

(10) Patent No.: US 9,094,657 B2
(45) Date of Patent: Jul. 28, 2015

(54) ELECTRONIC APPARATUS AND METHOD

(75) Inventor: Makoto Oshikiri, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 406 days.

(21) Appl. No.: 13/556,661

(22) Filed: Jul. 24, 2012

(65) Prior Publication Data

US 2013/0076873 A1      Mar. 28, 2013

(30) Foreign Application Priority Data

Sep. 22, 2011   (JP) ................................. 2011-207828

(51) Int. Cl.
*H04N 13/04* (2006.01)
*H04N 13/00* (2006.01)
*H04N 13/02* (2006.01)

(52) U.S. Cl.
CPC ........... *H04N 13/00* (2013.01); *H04N 13/0022* (2013.01); *H04N 13/04* (2013.01); *H04N 13/026* (2013.01); *H04N 2013/0081* (2013.01)

(58) Field of Classification Search
CPC .......... H04N 13/0497; H04N 13/0404; H04N 13/0409; H04N 13/0022
USPC .................................................... 348/42–60
See application file for complete search history.

(56) References Cited

U.S. PATENT DOCUMENTS

| 8,131,064 | B2 | 3/2012 | Mashitani et al. |
| 2005/0089212 | A1 | 4/2005 | Mashitani et al. |
| 2007/0159476 | A1 | 7/2007 | Grasnick |
| 2007/0236560 | A1 | 10/2007 | Lipton et al. |
| 2011/0090217 | A1 | 4/2011 | Mashitani et al. |
| 2011/0102427 | A1 | 5/2011 | Mashitani et al. |
| 2011/0102428 | A1 | 5/2011 | Mashitani et al. |
| 2011/0103680 | A1 | 5/2011 | Mashitani et al. |
| 2011/0157173 | A1 | 6/2011 | Mashitani et al. |
| 2011/0157174 | A1 | 6/2011 | Mashitani et al. |

(Continued)

FOREIGN PATENT DOCUMENTS

| CN | 1726726 A | 1/2006 |
| CN | 1739303 A | 2/2006 |

(Continued)

OTHER PUBLICATIONS

Office Action dated May 21, 2014 of corresponding Chinese Patent Application 2012102758170—20 pages.

(Continued)

*Primary Examiner* — Michael Lee
(74) *Attorney, Agent, or Firm* — Knobbe, Martens, Olson & Bear LLP

(57) ABSTRACT

According to one embodiment, a stereoscopic image converting method includes: generating a first depth map comprising depth values of pixels of an input video, wherein the depth values are estimated based on an amount of a characteristic of the input video, and wherein the depth values are represented by pixel shading; generating a second depth map by correcting the depth values of pixels within a distance from each of right and left ends of the depth map to become closer to a depth value corresponding to a screen of a display not protruding forward or recede rearward in stereoscopic viewing as the pixels within the first distance are positioned closer to the each of the right and left ends of the depth map; and generating a multi-parallax image by shifting pixels of the input video by an amount horizontally based on the depth values of the second depth map.

9 Claims, 14 Drawing Sheets

(56) References Cited

U.S. PATENT DOCUMENTS

| | | | |
|---|---|---|---|
| 2011/0157319 A1 | 6/2011 | Mashitani et al. | |
| 2011/0157328 A1 | 6/2011 | Ishiyama et al. | |
| 2011/0193861 A1 | 8/2011 | Mashitani et al. | |
| 2012/0013718 A1* | 1/2012 | Mizutani | 348/54 |
| 2012/0044249 A1 | 2/2012 | Mashitani et al. | |
| 2012/0050469 A1* | 3/2012 | Takesue | 348/43 |
| 2012/0056984 A1* | 3/2012 | Zhang et al. | 348/43 |
| 2012/0287252 A1 | 11/2012 | Tsuchida | |

FOREIGN PATENT DOCUMENTS

| | | | |
|---|---|---|---|
| CN | 102160388 A | 8/2011 | |
| JP | 2000-357007 A | 12/2000 | |
| JP | 2001-359119 A | 12/2001 | |
| JP | 2004-007396 A | 1/2004 | |
| JP | 2004-221699 A | 8/2004 | |
| JP | 2004-221700 A | 8/2004 | |
| JP | 2004-320189 A | 11/2004 | |
| JP | 2007-506167 A | 3/2007 | |
| JP | 2009-533897 A | 9/2009 | |
| JP | 2010-103866 A | 5/2010 | |
| JP | 2011-035712 A | 1/2011 | |
| JP | 2011-035712 A | 2/2011 | |
| JP | 2011-164202 A | 8/2011 | |
| WO | WO 2004/056133 A1 | 7/2004 | |
| WO | WO 2004/071102 A1 | 8/2004 | |
| WO | WO 2007/117471 A2 | 10/2007 | |

OTHER PUBLICATIONS

Office Action dated Nov. 27, 2012 of corresponding Japanese Patent Application 2011-207828—6 pages.

Office Action dated Apr. 2, 2013 of corresponding Japanese Patent Application 2011-207828—5 pages.

* cited by examiner

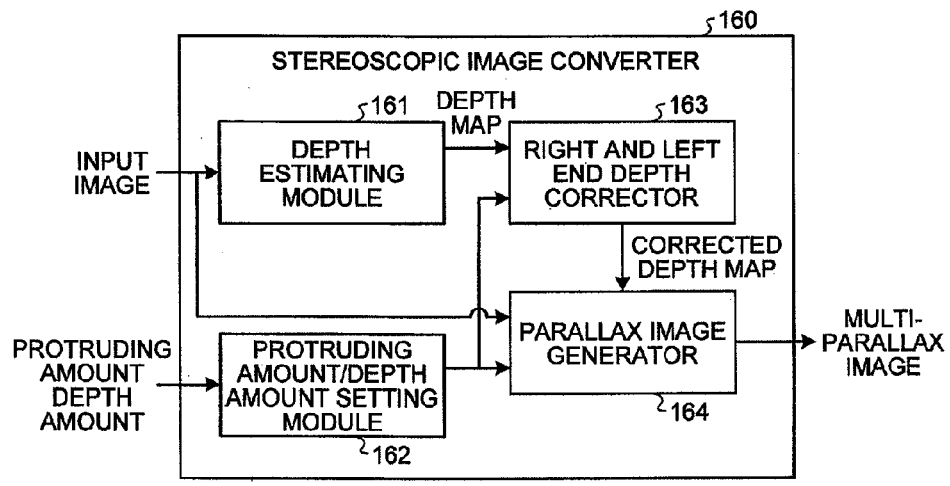
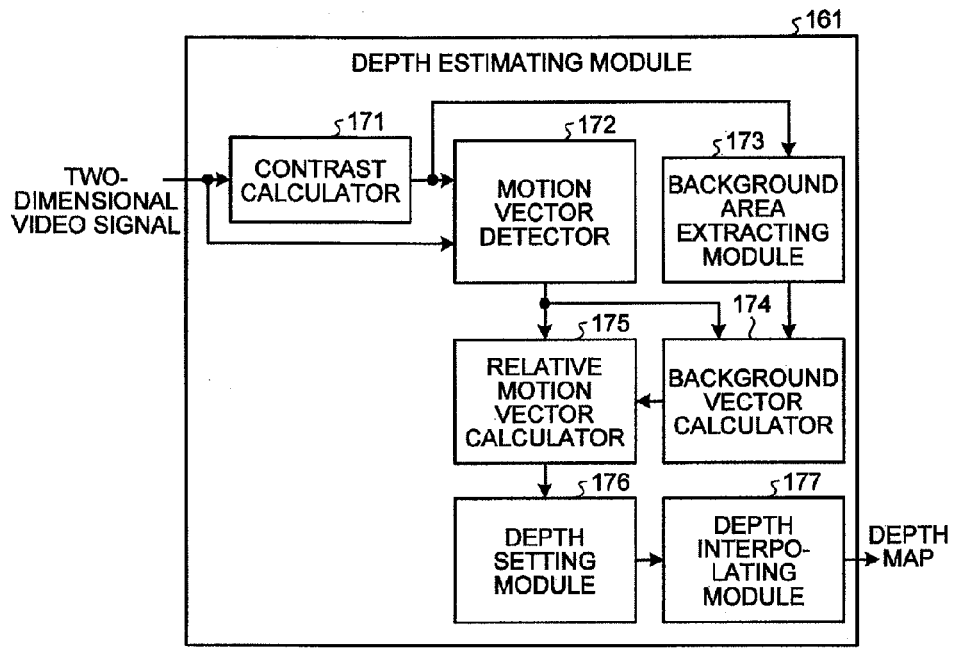

FIG.7A
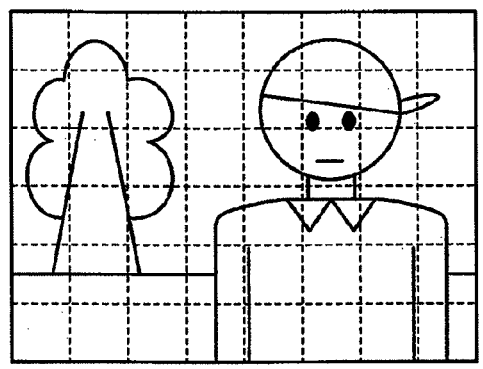
FIG.7B
FIG.8
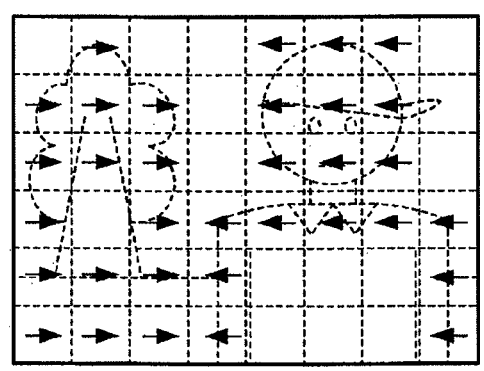

AREA IN WHICH DEPTH IS INTERPOLATED

INPUT IMAGE → DEPTH MAP

※ THE DARKER PIXEL IS, THE MORE FRONT SIDE PIXEL IS LOCATED ON

FIG.17
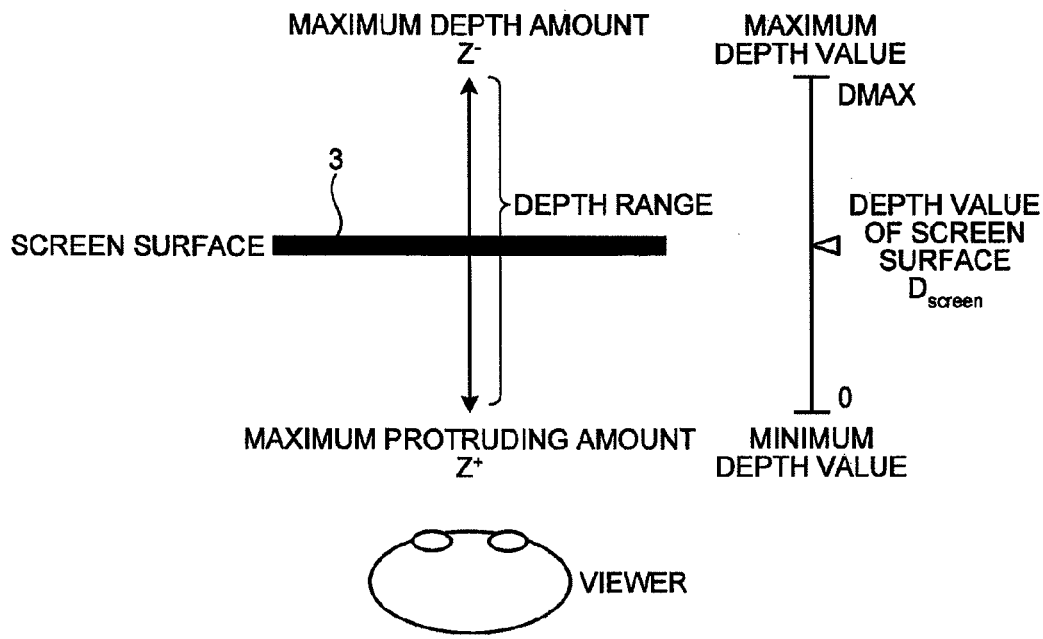
VIEWER
FIG.18
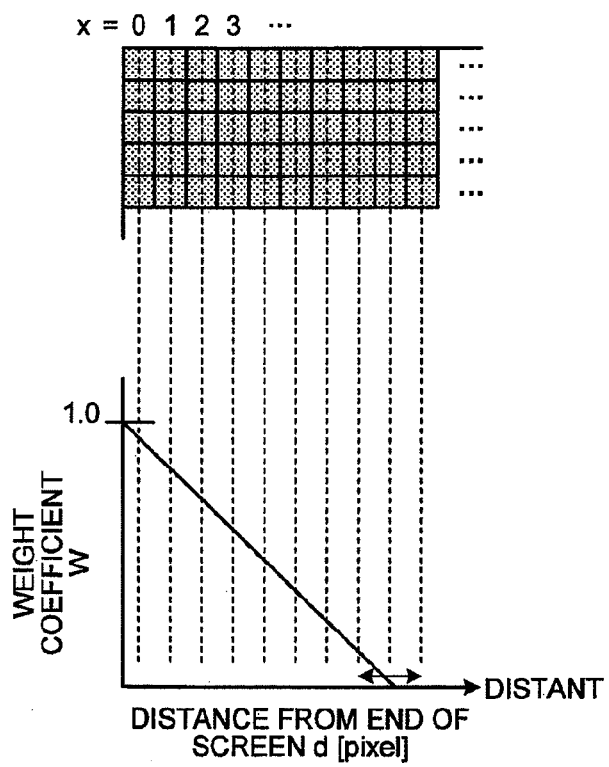

US 9,094,657 B2

ELECTRONIC APPARATUS AND METHOD

CROSS-REFERENCE TO RELATED APPLICATIONS

This application is based upon and claims the benefit of priority from Japanese Patent Application No. 2011-207828, filed on Sep. 22, 2011, the entire contents of which are incorporated herein by reference.

FIELD

Embodiments described herein relate generally to a stereoscopic image converting apparatus, a stereoscopic image output apparatus, and a stereoscopic image converting method.

BACKGROUND

Conventionally, there has been developed a technology for causing a viewer to recognize a stereoscopic image by using a flat video display screen. In the technology, stereoscopic viewing is achieved by: preparing two types of videos having parallax corresponding to the distance between both eyes of a human; and causing the right eye of the viewer to visually recognize a right-eye video, and causing the left eye of the viewer to visually recognize a left-eye video.

Specifically, there is a technology for causing the viewer to recognize a stereoscopic image by: outputting a right-eye video and a left-eye video in a time-division manner, and displaying the images alternately on a single video display screen; and controlling a pair of stereoscopic glasses worn by the viewer such that a left-eye shutter is closed when the right-eye image is being displayed, and a right-eye shutter is closed when the left-eye image is being displayed.

Such multi-parallax images with a plurality of viewpoints (the right-eye video and the left-eye video) are created by various types of methods, such as generation of the multi-parallax images based on the depth estimated from one or more input images. The input images are converted into such multi-parallax images for a stereoscopic image typically by: estimating the depth in the screen from the amount of characteristics (e.g., motions and colors) of the input images; and applying parallax to the input images depending on the depth to generate parallax images.

To generate such parallax images based on the depth estimated from an input image, if the depth values serving as depth information of right and left ends of the input image are made distant from the screen surface, the outside of the screen of the input image is referred to.

Because no pixel serving as a reference is present outside of the screen of the input image to be referred to, it is difficult to generate the parallax images properly. If the viewer views a stereoscopic video based on such parallax images, the parallax images are inconsistent with each other, and the ends of the screen appear to be broken.

In view of the background described above, it is an object of the present invention to provide a stereoscopic image converting apparatus, a stereoscopic image output apparatus, and a stereoscopic image converting method capable of preventing right and left ends of a stereoscopic video generated by shifting pixels of a base image depending on the parallax amount from being broken.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 5 is an exemplary block diagram of a configuration of a stereoscopic image converter in the embodiment;

FIG. 6 is an exemplary block diagram of a configuration of a depth estimating module in the embodiment;

FIGS. 7A and 7B are exemplary views for explaining a concept of an operation of a contrast calculator in the embodiment;

FIG. 8 is an exemplary view for explaining a concept of an operation of a motion vector detector in the embodiment;

FIG. 11 is an exemplary view for explaining a concept of an operation of a depth setting module in the embodiment;

FIG. 12 is an exemplary view for explaining a concept of an operation of a depth interpolating module in the embodiment;

FIG. 17 is an exemplary view for conceptually explaining calculation of a depth value corresponding to the screen surface in the embodiment;

FIG. 18 is an exemplary view for explaining the relationship between the weight on the left side of the depth map and the distance to a pixel to be corrected in the embodiment;

DETAILED DESCRIPTION

In general, according to one embodiment, A stereoscopic image converting apparatus comprises: a depth estimating module configured to generate a first depth map comprising depth values of pixels of an input video, wherein the depth values are estimated based on an amount of a characteristic of the input video, and wherein the depth values are represented by pixel shading; a right and left end depth corrector configured to generate a second depth map by correcting the depth values of pixels within a first distance from each of right and left ends of the first depth map to become closer to a depth value corresponding to a screen surface of a display that does not protrude forward or recede rearward in stereoscopic viewing as the pixels within the first distance are positioned closer to the each of the right and left ends of the first depth map; and a parallax image generator configured to generate a multi-parallax image by shifting pixels of the input video by an amount horizontally based on the depth values of the second depth map.

Figure 1:
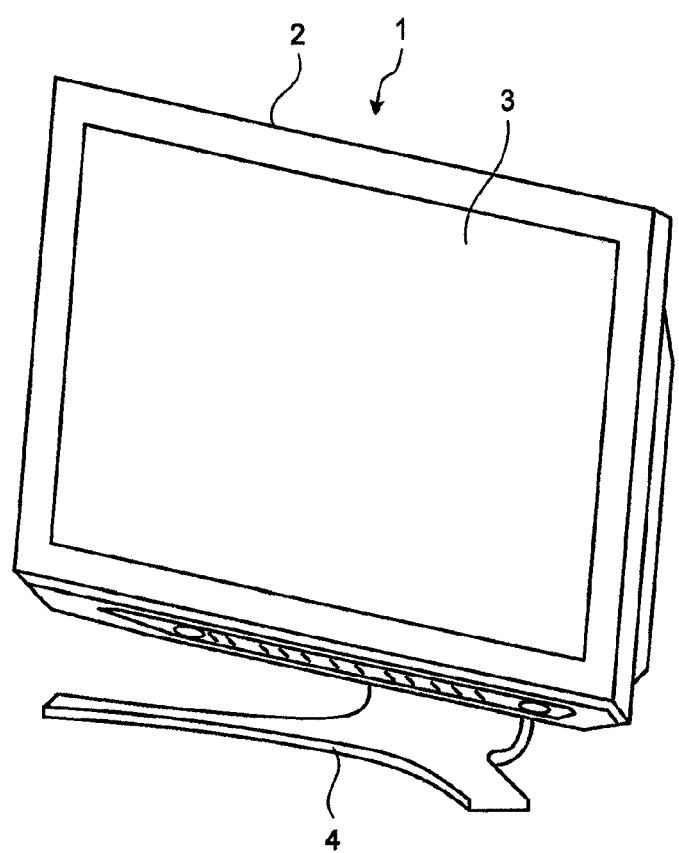
FIG. 1 is an exemplary perspective view of an appearance of a digital television according to an embodiment.

FIG. 1 is a perspective view of an appearance of a digital television 1 serving as a stereoscopic image output apparatus according to the present embodiment. As illustrated in FIG. 1, the digital television 1 has a rectangle-shaped appearance in a front view viewed from the front (in a planer view with respect to a front surface). The digital television 1 comprises a housing 2 and a liquid crystal display (LCD) panel 3. The LCD panel 3 is a display that receives a video signal from a video processor 20 (refer to FIG. 2), and that displays an image, such as a still image and a moving image. The housing 2 is supported by a support 4.

Figure 2:
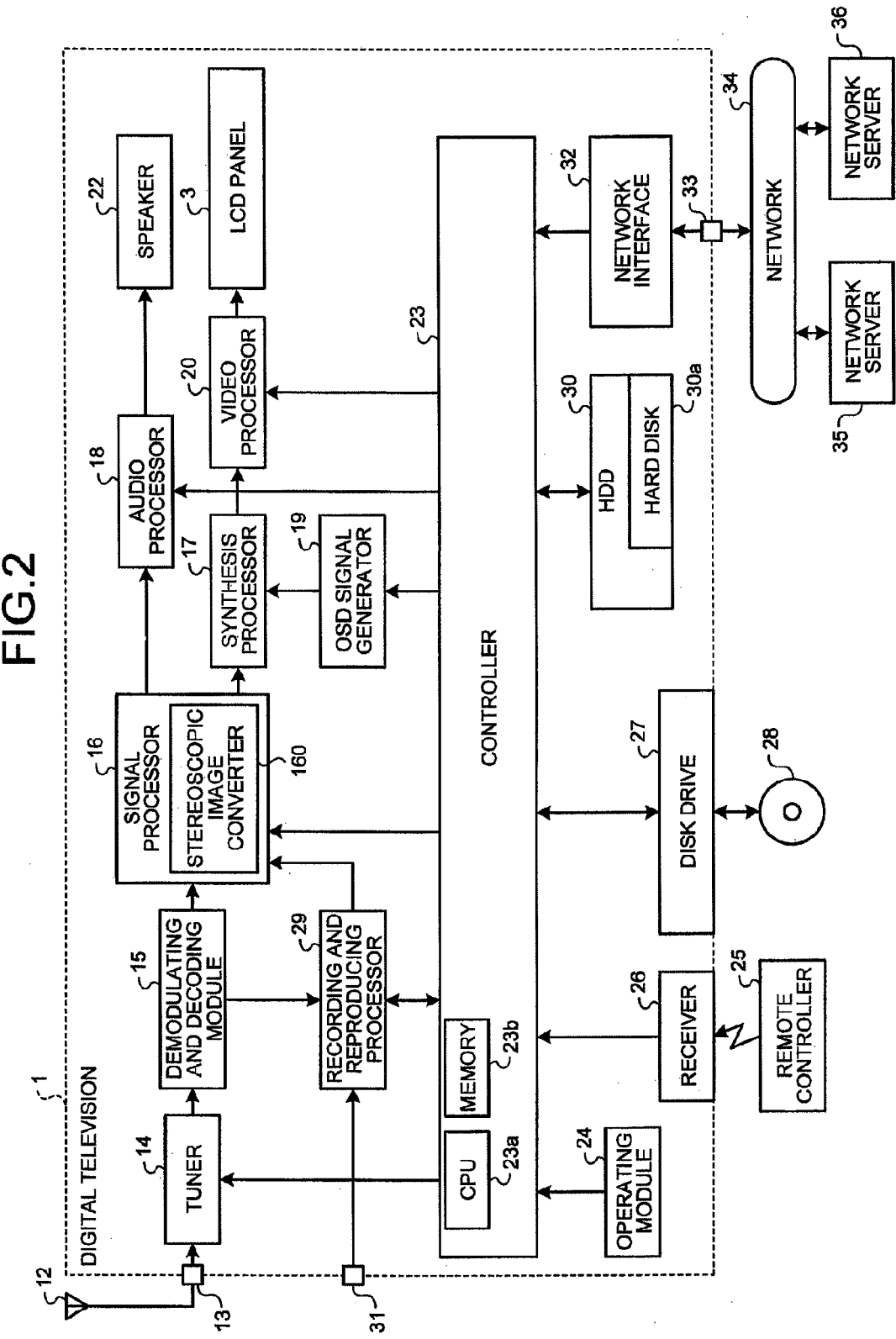
FIG. 2 is an exemplary block diagram of a signal processing system of the digital television in the embodiment.

FIG. 2 is a block diagram of a signal processing system of the digital television 1 in the embodiment. The digital television 1 can display not only a video based on a video signal for ordinary planer view (two-dimensional) display, but also an image based on a video signal for stereoscopic (three-dimensional) display.

As illustrated in FIG. 2, the digital television 1 supplies a digital television broadcast signal received by an antenna 12 to a tuner 14 via an input terminal 13, thereby making it possible to select a broadcast signal of a desired channel.

The digital television 1 then supplies the broadcast signal selected by the tuner 14 to a demodulating and decoding module 15 serving as a decoder, and decodes the broadcast signal into a digital video signal, a digital audio signal, and the like. Subsequently, the digital television 1 outputs the signals to a signal processor 16.

The signal processor 16 performs predetermined digital signal processing on the digital video signal and the digital audio signal supplied from the demodulating and decoding module 15. The predetermined digital signal processing performed by the signal processor 16 contains processing for converting a video signal for ordinary planer view (two-dimensional) display into a video signal for stereoscopic (three-dimensional) display and processing for converting a video signal for stereoscopic display into a video signal for planer view display, which will be described later.

Furthermore, the signal processor 16 outputs the digital video signal to a synthesis processor 17, and outputs the digital audio signal to an audio processor 18. The synthesis processor 17 superimposes an on screen display (OSD) signal on the digital video signal supplied from the signal processor 16, and outputs the video signal. The OSD signal is a video signal to be superimposed, such as a caption, a graphical user interface (GUI), and OSD, generated by an OSD signal generator 19. In this case, if the video signal supplied from the signal processor 16 is a video signal for ordinary planer view display, the synthesis processor 17 superimposes the OSD signal supplied from the OSD signal generator 19 on the video signal without any change, and outputs the video signal. By contrast, if the video signal supplied from the signal processor 16 is a video signal for stereoscopic display, the synthesis processor 17 performs signal processing for stereoscopic display corresponding to the video signal for stereoscopic display thus received on the OSD signal supplied from the OSD signal generator 19. Subsequently, the synthesis processor 17 superimposes the OSD signal on the received video signal, and outputs the video signal.

The digital television 1 supplies the digital video signal output from the synthesis processor 17 to the video processor 20. The video processor 20 converts the digital video signal thus received into an analog video signal in a format capable of being displayed on the LCD panel 3. The digital television 1 supplies the analog video signal output from the video processor 20 to the LCD panel 3, thereby displaying the signal as an image.

The audio processor 18 converts the digital audio signal thus received into an analog audio signal in a format capable of being reproduced by a speaker 22. By being supplied to the speaker 22, the analog audio signal output from the audio processor 18 is reproduced as a sound.

In the digital television 1, a controller 23 collectively controls all the operations including the various types of receiving operations described above. The controller 23 comprises a central processing unit (CPU) 23a. The controller 23 receives operation information from an operating module 24 arranged in the main body of the digital television 1, or receives operation information transmitted from a remote controller 25 and received by a receiver 26, and controls each module such that the contents of the operation are reflected.

The controller 23 uses a memory 23b. The memory 23b mainly comprises a read-only memory (ROM) that stores therein a control program executed by the CPU 23a, a random access memory (RAM) for providing a work area for the CPU 23a, and a nonvolatile memory that stores therein various types of setting information, control information, and the like. Furthermore, a disk drive 27 is connected to the controller 23, and the disk drive 27 allows an optical disk 28, such as a digital versatile disk (DVD), to be inserted therein and ejected therefrom. The disk drive 27 has a function to record and reproduce digital data on and from the optical disk 28 thus inserted.

Based on the operations of the operating module 24 and the remote controller 25 performed by a viewer, the controller 23 can perform control as follows: a recording and reproducing processor 29 encodes the digital video signal and the digital audio signal acquired from the demodulating and decoding module 15, and converts the signals into a predetermined recording format; and the signals thus converted are supplied to the disk drive 27 to be recorded on the optical disk 28.

Furthermore, based on the operations of the operating module 24 and the remote controller 25 performed by the viewer, the controller 23 can perform control as follows: the disk drive 27 reads a digital video signal and a digital audio signal from the optical disk 28; the recording and reproducing processor 29 serving as a decoder decodes the signals; and the signals thus decoded are supplied to the signal processor 16, and thereafter are displayed as an image and reproduced as a sound as described above.

A hard disk drive (HDD) 30 is connected to the controller 23. Based on the operations of the operating module 24 and the remote controller 25 performed by the viewer, the controller 23 can perform control as follows: the recording and reproducing processor 29 encodes the digital video signal and the digital audio signal acquired from the demodulating and decoding module 15, and converts the signals into a predetermined recording format; and the signals thus converted are supplied to the HDD 30 to be recorded on a hard disk 30a.

Furthermore, based on the operations of the operating module 24 and the remote controller 25 performed by the viewer, the controller 23 can perform control as follows: the HDD 30 reads a digital video signal and a digital audio signal from the hard disk 30a; the recording and reproducing processor 29 decodes the signals; and the signals thus decoded are supplied to the signal processor 16, and thereafter are displayed as an image and reproduced as a sound as described above.

An input terminal 31 is also connected to the digital television 1. The input terminal 31 is used for receiving a digital video signal and a digital audio signal directly from outside of the digital television 1. The digital video signal and the digital audio signal received via the input terminal 31 are transmitted to the recording and reproducing processor 29 based on the control performed by the controller 23. Subsequently, the signals are supplied to the signal processor 16, and thereafter are displayed as an image and reproduced as a sound as described above.

The digital video signal and the digital audio signal received via the input terminal 31 are transmitted to the recording and reproducing processor 29 based on the control performed by the controller 23. Subsequently, the signals are recorded on and reproduced from the optical disk 28 by the disk drive 27, or are recorded on and reproduced from the hard disk 30a by the HDD 30.

In addition, based on the operations of the operating module 24 and the remote controller 25 performed by the viewer, the controller 23 performs control between the disk drive 27 and the HDD 30. Specifically, the digital video signal and the digital audio signal recorded in the optical disk 28 are recorded into the hard disk 30a, whereas the digital video signal and the digital audio signal recorded in the hard disk 30a are recorded into the optical disk 28.

A network interface 32 is connected to the controller 23. The network interface 32 is connected to an external network 34 via an input/output terminal 33. A plurality of (two in FIG. 2) network servers 35 and 36 are connected to the network 34. The network servers 35 and 36 provide various types of services by using a communication function via the network 34. Therefore, the controller 23 accesses a desired network server between the network servers 35 and 36 via the network interface 32, the input/output terminal 33, and the network 34 to perform information communications. As a result, the controller 23 can use the services provided on the server.

The digital television 1 can play, stop, and pause the information of the video, the audio, and the like acquired from the disk drive 27 and the HDD 30 by operating a play and stop key and a play/pause key of the remote controller 25. Furthermore, the digital television 1 can perform so-called skipping-forward and skipping-backward on the information of the video, the audio, and the like being played by the disk drive 27 and the HDD 30 by operating a skip-backward key and a skip-forward key of the remote controller 25. In the skipping-forward and the skipping-backward, the information is skipped by a constant amount in a backward direction and a forward direction with respect to the playing direction. Furthermore, the digital television 1 can perform so-called fast-forward play and fast-backward play on the information of the video, the audio, and the like being played by the disk drive 27 and the HDD 30 by operating a fast-backward key, a fast-forward key, and the like of the remote controller 25. In the fast-forward play and the fast-backward play, the information is played continuously at fast speed in the backward direction and the forward direction with respect to the playing direction.

Figure 3:
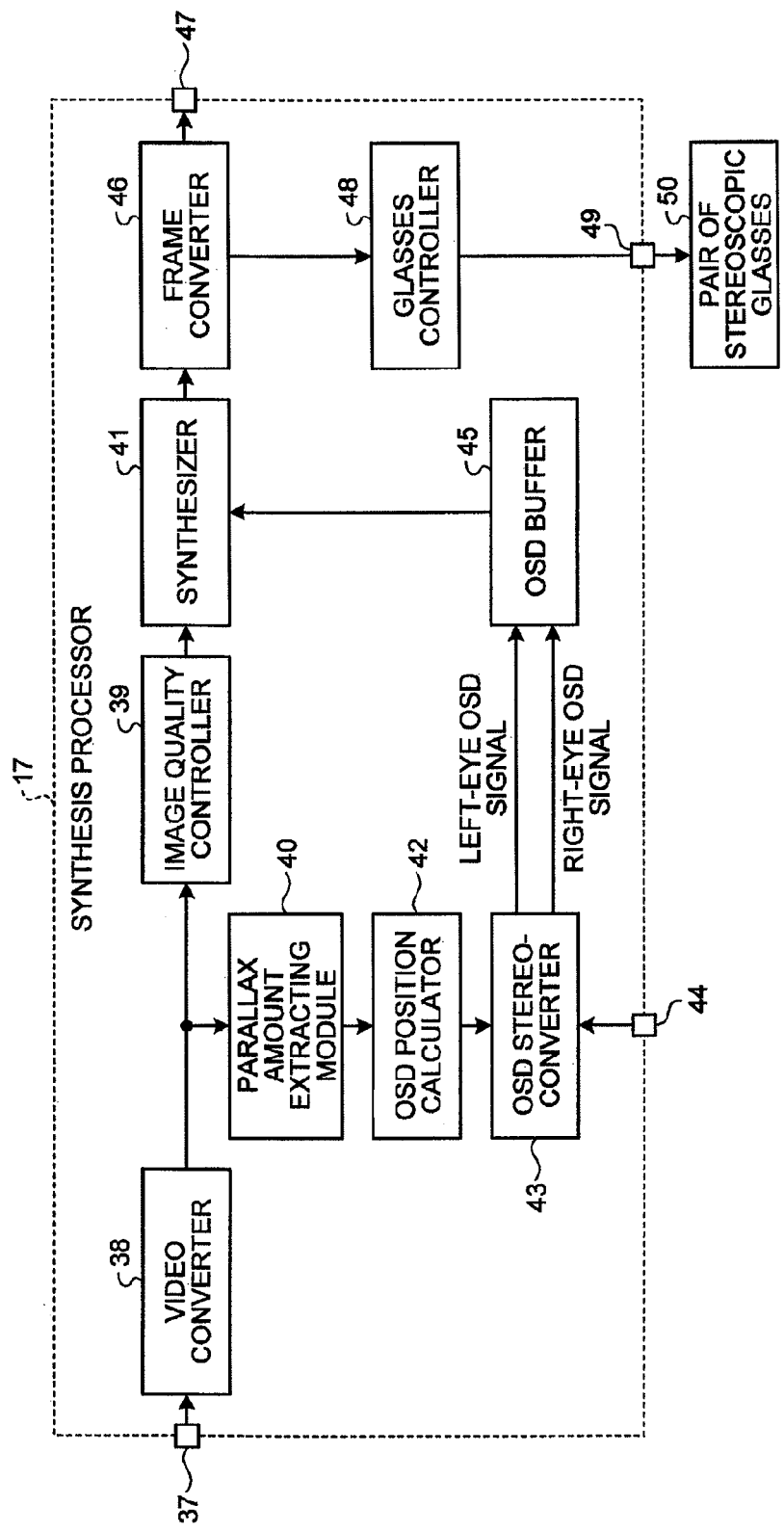
FIG. 3 is an exemplary block diagram of a configuration of a synthesis processor in the embodiment.

FIG. 3 is a block diagram of a configuration of the synthesis processor 17 in the embodiment. As illustrated in FIG. 3, the synthesis processor 17 supplies the digital video signal output from the signal processor 16 to a video converter 38 functioning as a video generator via an input terminal 37.

If the video signal thus received is a video signal for stereoscopic (three-dimensional) display, the video converter 38 converts the video signal into a specific video format, and outputs the video signal to an image quality controller 39 and a parallax amount extracting module 40. In other words, for the video signal for stereoscopic display, various types of video formats are employed. Examples of the video formats include a frame packing (top and bottom) method, a side by side method, and an interleave method. In the frame packing (top and bottom) method, a right-eye video frame is transmitted following a left-eye video frame in one frame synchronization period. In the side by side method, a right-eye video line is transmitted following a left-eye video line in one horizontal period. Furthermore, each of the video formats employs various types of video sizes, scanning methods (interlace/progressive), and the like. Therefore, in the digital television 1 according to the present embodiment, the video converter 38 performs appropriate processing, such as scaling and interlace/progressive (IP) conversion, on the video signal for stereoscopic display thus received. As a result, the video converter 38 converts the video signal into a video format of a frame sequential method in a video size of 1920 pixels in the horizontal direction and 1080 lines in the vertical direction. The video converter 38 then outputs the video signal to the image quality controller 39 and the parallax amount extracting module 40. In the frame sequential method, L (a left-eye video) and R (a right-eye video) are output in a time-division manner for each frame, and are displayed alternately on the LCD panel 3.

In other words, the digital television 1 according to the present embodiment can deal with various types of video formats for stereoscopic display in addition to the video format of the frame sequential method.

Furthermore, the video converter 38 performs super-resolution processing. The super-resolution processing is a technology for restoring an image signal supposed to be included in an original input image by comparing a temporary low-resolution image obtained by down-converting a temporary high-resolution image that is up-converted with an image emphasized by applying a sharp mask on the original input image. The more the comparison and the restoration are repeated, the more accurate the super-resolution processing becomes. Therefore, the processing in which the comparison and the restoration are performed once is defined as the super-resolution processing, whereas the processing in which the comparison and the restoration are repeated a plurality of times is also defined as the super-resolution processing. If there is enough time, such as the case where the viewer views a recorded image later, and the case where a time lag caused by the super-resolution processing is acceptable, it is possible to perform the super-resolution processing in which the comparison and the restoration are repeated a plurality of times.

However, the method of the super-resolution processing performed by the video converter 38 is not limited to the method described above, and various types of methods can be applied thereto. For example, a high-resolution image signal is restored by estimating an original pixel value from a low-resolution or middle-resolution image signal to increase pixels. The super-resolution processing contains analyzing the resolution histogram of the image itself, and performing optimum high-definition processing depending on the resolution. For example, the super-resolution processing contains analyzing the resolution histogram of the video itself of the video signal received in 1920×1080 HD resolution, and sharpening the video depending on the resolution (e.g., 1920×1080 resolution). In this case, while the resolution is not changed by the super-resolution processing, it is possible to improve the sense of resolution of the image enjoyed by the viewer.

By performing the super-resolution processing in the video converter 38 in this manner, it is possible to realize a higher-resolution stereoscopic image. In particular, in the frame packing method, the side by side method, and the interleave method, an image in one-half resolution of the original video is input. Therefore, a stereoscopic image having resolution close to that of the original video can be obtained by the super-resolution.

Furthermore, the video converter 38 has a function to up-convert a frame rate by interpolating or extrapolating a frame. With this function, it is possible to up-convert the video at a low frame rate. In particular, because video data in the frame sequential method is often at a low frame rate, it is possible to realize a stereoscopic image at a higher frame rate by up-converting the frame rate.

The image quality controller 39 performs image quality adjustment processing, such as brightness adjustment, contrast adjustment, and hue adjustment, based on control performed by the controller 23 on the video signal thus received. The image quality controller 39 then synchronizes the video signal with a vertical synchronizing signal, and outputs the video signal to a synthesizer 41.

The parallax amount extracting module 40 compares the video in the left-eye video frame with the video in the right-eye video frame of the video signal for stereoscopic display converted into the video format of the frame sequential method by the video converter 38, thereby extracting the parallax amount. The parallax amount extracting module 40 extracts the parallax amount by: using the position of an object being displayed in the left-eye video frame as a reference; and representing the position gap in the horizontal direction of the object being displayed in the right-eye video frame by the number of pixels. By using a motion-vector technology for detecting the movement position of a single object displayed in consecutive frames, it is possible to facilitate realizing the parallax amount extraction processing.

Specifically, by assigning numbers of 1 to 1920 to 1920 pixels arranged in the horizontal direction in the screen, and subtracting the pixel number in a predetermined position of the object being displayed in the right-eye video frame from the pixel number in the predetermined position of the object being displayed in the left-eye video frame, it is possible to represent the parallax amount by the number of pixels.

In this case, if the parallax amount is a negative value, the right-eye video presents closer to the right side than the left-eye video, and the video of the object is formed closer to the rear side with respect to the screen. By contrast, if the parallax amount is a positive value, the right-eye video presents closer to the left side than the left-eye video, and the video of the object is formed closer to the front side with respect to the screen.

The parallax amount extracted by the parallax amount extracting module 40 is supplied to an OSD position calculator 42 functioning as an image generator. Based on the parallax amount thus input, the OSD position calculator 42 performs calculation for correcting the display position of OSD when displaying the OSD stereoscopically, and outputs a parallax control signal indicating the calculation result.

The OSD position calculator 42 performs the calculation for correcting the display position of OSD when displaying the OSD stereoscopically in a state where the parallax amount extracted by the parallax amount extracting module 40 does not fluctuate in the time axis direction, or a video display state where the parallax amount gradually fluctuates in the time axis direction. In other words, if the parallax amount widely fluctuates in the time axis direction, the video moves significantly in the depth direction. Because the viewer focuses on the video in this state, the OSD to be superimposed becomes hard to see if the OSD also moves significantly in the depth direction. Therefore, if the parallax amount widely fluctuates, the OSD position calculator 42 outputs a parallax control signal indicating a result calculated when the fluctuation in the parallax amount is small.

The parallax control signal output from the OSD position calculator 42 is supplied to an OSD stereo-converter 43. The OSD signal output from the OSD signal generator 19 is supplied to the OSD stereo-converter 43 via an input terminal 44. Based on the parallax control signal, the OSD stereo-converter 43 generates a left-eye OSD signal to be superimposed on the left-eye video frame and a right-eye OSD signal to be superimposed on the right-eye video frame from the OSD signal thus received. The OSD stereo-converter 43 then outputs the left-eye OSD signal and the right-eye OSD signal to an OSD buffer 45, and causes the OSD buffer 45 to store therein the signals.

Specifically, if an OSD signal for adjusting the brightness is supplied from the OSD signal generator 19, the OSD stereo-converter 43 causes the OSD buffer 45 to store therein the left-eye OSD signal and the right-eye OSD signal as follows: left-eye OSD for adjusting the brightness and right-eye OSD for adjusting the brightness are displayed in the left-eye video frame and the right-eye video frame, respectively, in the video format of the frame sequential method in a video size of 1920 pixels in the horizontal direction and 1080 lines in the vertical direction generated by the video converter 38. The left-eye OSD for adjusting the brightness and the right-eye OSD for adjusting the brightness have the parallax amount (position gap) in the horizontal direction for the number of pixels based on the parallax control signal. The left-eye OSD signal and the right-eye OSD signal stored in the OSD buffer 45 are output to the synthesizer 41 in synchronization with the vertical synchronizing signal.

Therefore, the synthesizer 41 synthesizes the video signal output from the image quality controller 39 and the video signal output from the OSD buffer 45. In this case, the left-eye OSD signal output from the OSD buffer 45 is superimposed on the video signal of the left-eye video frame output from the image quality controller 39. By contrast, the right-eye OSD signal output from the OSD buffer 45 is superimposed on the video signal of the right-eye video frame output from the image quality controller 39.

The video signal synthesized by the synthesizer 41 is supplied to a frame converter 46, and the vertical synchronization frequency of the video signal is converted into double, that is, the frame frequency is made at double speed. Subsequently, the video signal is output from an output terminal 47 to an LCD 3a of the LCD panel 3 via the video processor 20. As a result, the LCD 3a of the LCD panel 3 displays the left-eye video frame on which the left-eye OSD signal is superimposed and the right-eye video frame on which the right-eye OSD signal is superimposed alternately. In other words, the LCD 3a functioning as a video display has a function to output the left-eye video frame and the right-eye video frame in a time-division manner.

Furthermore, a frame synchronizing signal generated by the frame converter 46 is supplied to a glasses controller 48. Based on the frame synchronizing signal supplied from the frame converter 46, the glasses controller 48 generates a left-eye shutter control signal and a right-eye shutter control signal, and outputs the signals to a pair of stereoscopic glasses worn by the viewer via an output terminal 49.

Figure 4:
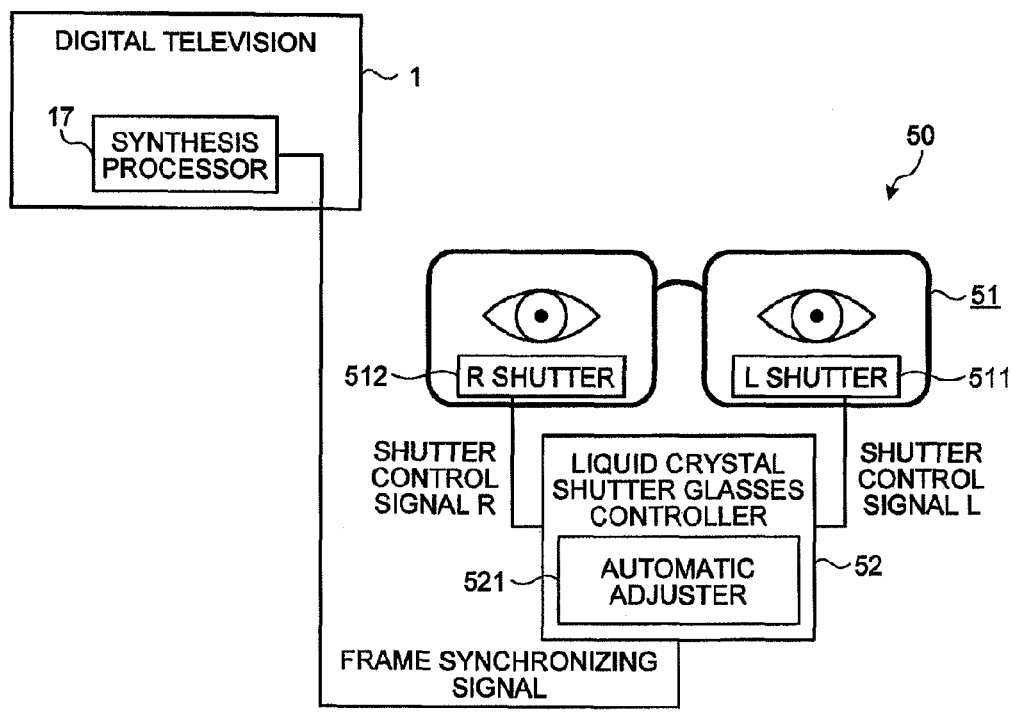
FIG. 4 is an exemplary block diagram of a configuration of a pair of stereoscopic glasses in the embodiment.

FIG. 4 is a block diagram of a configuration of the pair of stereoscopic glasses 50 in the embodiment. As illustrated in FIG. 4, the pair of stereoscopic glasses 50 comprises a pair of liquid crystal shutter glasses 51 and a liquid crystal shutter glasses controller 52.

The pair of liquid crystal shutter glasses 51 comprises a left-eye liquid crystal shutter (L shutter) 511 for permitting or blocking the left-eye view and a right-eye liquid crystal shutter (R shutter) 512 for permitting or blocking the right-eye view. The viewer wears the pair of liquid crystal shutter glasses 51, and views the left-eye image and the right-eye image displayed alternately by the left eye and the right eye alternately, thereby physically experiencing stereoscopic viewing.

As illustrated in FIG. 4, the synthesis processor 17 outputs frame data used for causing the digital television 1 to display the left-eye image and the right-eye image alternately, and the liquid crystal shutter glasses controller 52 receives the frame synchronizing signal output together with the frame data from the synthesis processor 17. Based on the frame synchronizing signal, the liquid crystal shutter glasses controller 52 generates a shutter control signal L for opening and closing the L shutter 511 and a shutter control signal R for opening and closing the R shutter 512, and supplies the signals to the pair of liquid crystal shutter glasses 51. The liquid crystal shutter glasses controller 52 comprises an automatic adjuster 521 that automatically adjusts the shutter control signal L and the shutter control signal R.

The glasses controller 48 of the synthesis processor 17 performs control such that, when the left-eye video is being displayed, the R shutter 512 for the right eye of the pair of stereoscopic glasses 50 is closed, whereas when the right-eye video is being displayed, the L shutter 511 for the left eye of the pair of stereoscopic glasses 50 is closed. With this control, the viewer recognizes a stereoscopic video.

If the digital video signal output from the signal processor 16 is a video signal for ordinary planer view (two-dimensional) display, the left-eye video frame and the right-eye video frame output from the video converter 38 in the video format of the frame packing method have exactly the same video. As a result, the parallax amount extracted by the parallax amount extracting module 40 is 0. Therefore, the OSD stereo-converter 43 causes the OSD buffer 45 to store therein the OSD signal supplied from the OSD signal generator 19 such that the OSD signal is displayed at the same position in the left-eye video frame and the right-eye video frame in the video format of the frame sequential method. Thus, the video signal for planer view (two-dimensional) display on which the OSD signal is superimposed is output from the synthesizer 41, and the frame frequency thereof is made at double speed by the frame converter 46. Subsequently, the video signal is output from the output terminal 47 to the LCD 3a of the LCD panel 3 via the video processor 20, and is displayed as a video for ordinary two-dimensional display.

When displaying OSD, the digital television 1 determines the parallax amount between the left-eye OSD signal and the right-eye OSD signal based on the parallax amount between the left-eye video frame and the right-eye video frame to be displayed stereoscopically. The digital television 1 then synthesizes the video signals in the left-eye and right-eye video frames and the left-eye and right eye OSD signals, respectively. With this configuration, it is possible to display the OSD on the stereoscopic video without a feeling of strangeness. This allows the viewer to read OSD displayed while viewing the stereoscopic video, and to perform an operation, such as various types of adjustment and setting, by displaying OSD while viewing the stereoscopic video in a simple manner. Therefore, the viewer can handle the OSD more usefully.

The explanation has been made of the case where the OSD is displayed while the stereoscopic video is being displayed in the digital television 1 according to the present embodiment. However, the information to be displayed is not limited to the OSD. For example, this technology is widely applicable to a screen display signal that is generated by the digital television 1 independently, and is capable of being displayed thereon in addition to the display image based on the video signal acquired from broadcasting, the optical disk 28, the hard disk 30a, or the network servers 35 and 36.

A detailed explanation will be made of stereoscopic image conversion processing performed by the signal processor 16 of the digital television 1 according to the present embodiment. The stereoscopic image conversion processing is processing for converting a video signal (input video) for ordinary planer view (two-dimensional) display into a video signal for stereoscopic (three-dimensional) display. FIG. 5 is a block diagram of a configuration of a stereoscopic image converter 160 of the signal processor 16 in the embodiment. As illustrated in FIG. 5, the stereoscopic image converter 160 functions as a stereoscopic image converting device, and comprises a depth estimating module 161, a protruding amount/depth amount setting module 162, a right and left end depth corrector 163, and a parallax image generator 164.

The depth estimating module 161 estimates the depth value in the screen based on the amount of characteristics (e.g., motions and colors) of the input image that is the digital video signal supplied from the demodulating and decoding module 15, thereby generating a depth map.

An example of the method for estimating the depth value employed in the depth estimating module 161 will now be described in detail. FIG. 6 is a block diagram of a configuration of the depth estimating module 161 in the embodiment. As illustrated in FIG. 6, the depth estimating module 161 comprises a contrast calculator 171, a motion vector detector 172, a background area extracting module 173, a background vector calculator 174, a relative motion vector calculator 175, a depth setting module 176, and a depth interpolating module 177.

The two-dimensional digital video signal supplied from the demodulating and decoding module 15 is received by the contrast calculator 171. The contrast calculator 171 calculates contrast in each area in the two-dimensional image, and outputs the contrast to the motion vector detector 172. FIGS. 7A and 7B are views for explaining a concept of the operation of the contrast calculator 171 in the embodiment. As illustrated in FIG. 7A, the contrast calculator 171 divides the two-dimensional image into rectangular areas in a predetermined size. The contrast, calculator 171 then obtains difference between the pixel value of each of the areas and those of adjacent pixels, thereby calculating the contrast in each of the areas. Furthermore, as illustrated in FIG. 7B, the contrast calculator 171 labels each of the areas with A, B, and C such that the contrast value decreases in order of A, B, and C based on the results of calculation of the contrast.

The motion vector detector 172 calculates a motion vector (amount of characteristics) only for the areas labeled with A and B, and outputs the motion vector to the background area extracting module 173. FIG. 8 illustrates the state where the motion vector (amount of characteristics) is calculated.

The background area extracting module 173 determines the area labeled with B by the contrast calculator 171 to be a background area, and outputs the background area to the background vector calculator 174.

Figure 9:
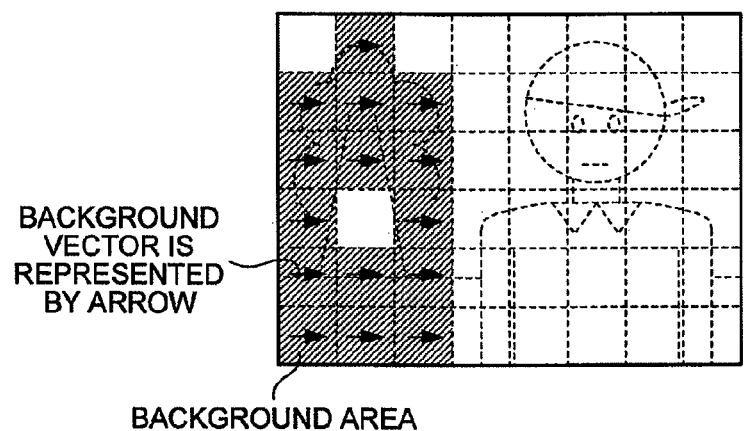
FIG. 9 is an exemplary view for explaining a concept of an operation of a background area extracting module and a background vector calculator in the embodiment.

The background vector calculator 174 calculates the average of the motion vectors in the background areas, and determines the average to be a background vector. The background vector calculator 174 then outputs the background vector to the relative motion vector calculator 175. FIG. 9 illustrates the state where the background vector is calculated.

Figure 10:
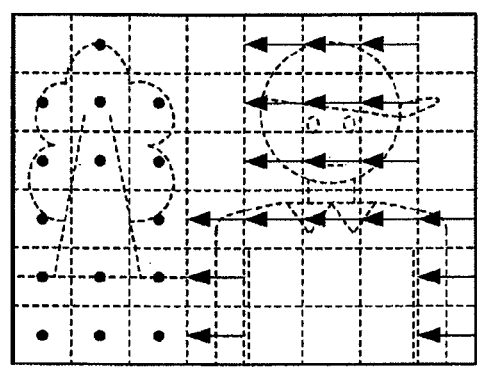
FIG. 10 is an exemplary view for explaining a concept of an operation of a relative motion vector calculator in the embodiment.

The relative motion vector calculator 175 calculates a relative motion vector by subtracting the background vector from the motion vector in the areas labeled with A and B, and outputs the relative motion vector to the depth setting module 176. FIG. 10 illustrates the state where the relative motion vector is calculated.

Figures 11, 12:
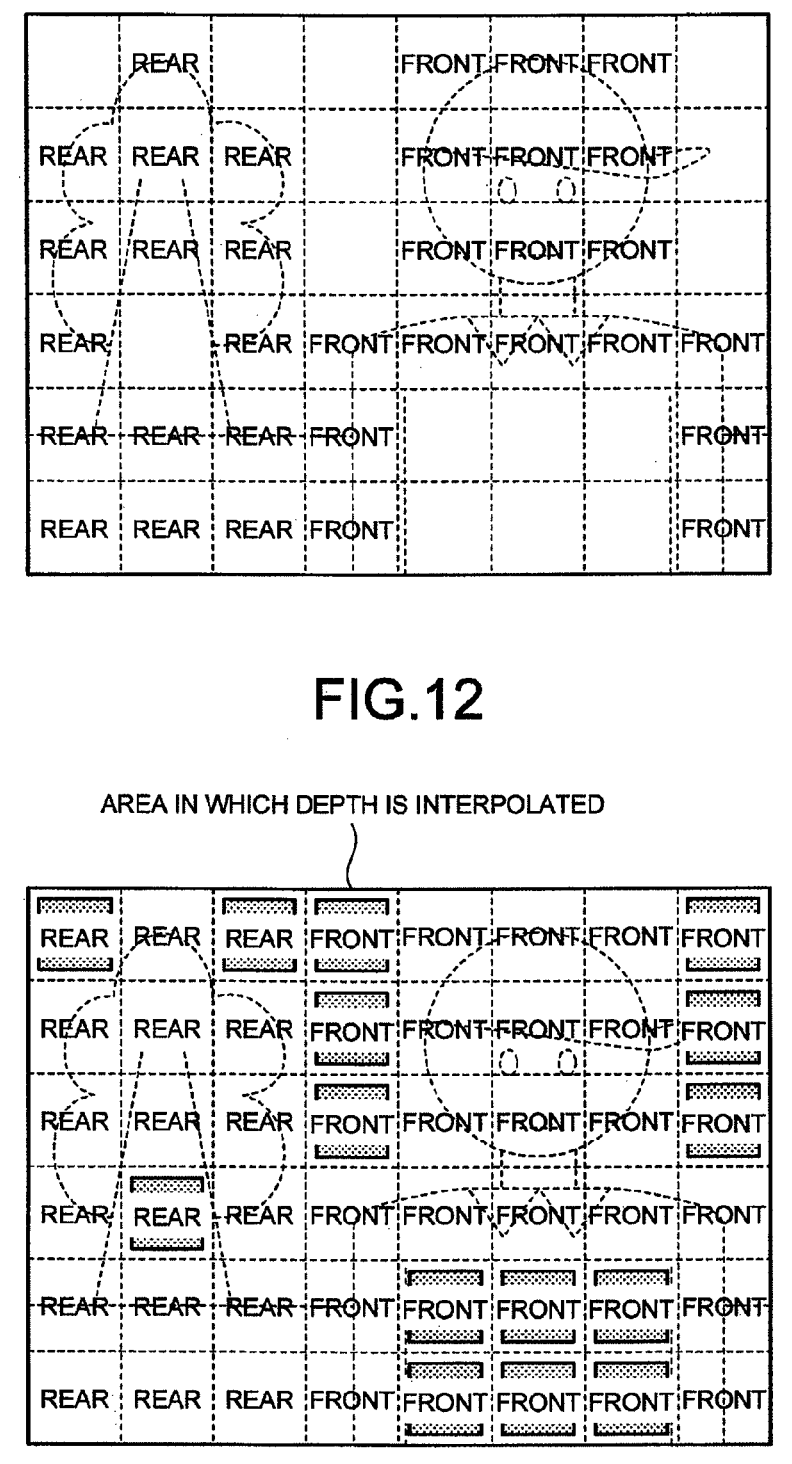

The depth setting module 176 estimates the depth value of the areas labeled with A and B with reference to the value of the relative motion vector, and outputs the depth value to the depth interpolating module 177. The depth setting module 176, for example, determines that the area having a larger relative motion vector is located on the front side, and that the area having a smaller relative motion vector is located on the rear side. FIG. 11 illustrates this state.

The depth interpolating module 177 interpolates the area labeled with C with the depth values of areas adjacent thereto. The depth interpolating module 177, for example, interpolates the area with the depth value that is in the majority among the depth values of the areas adjacent thereto. FIG. 12 illustrates this state.

Figure 13:
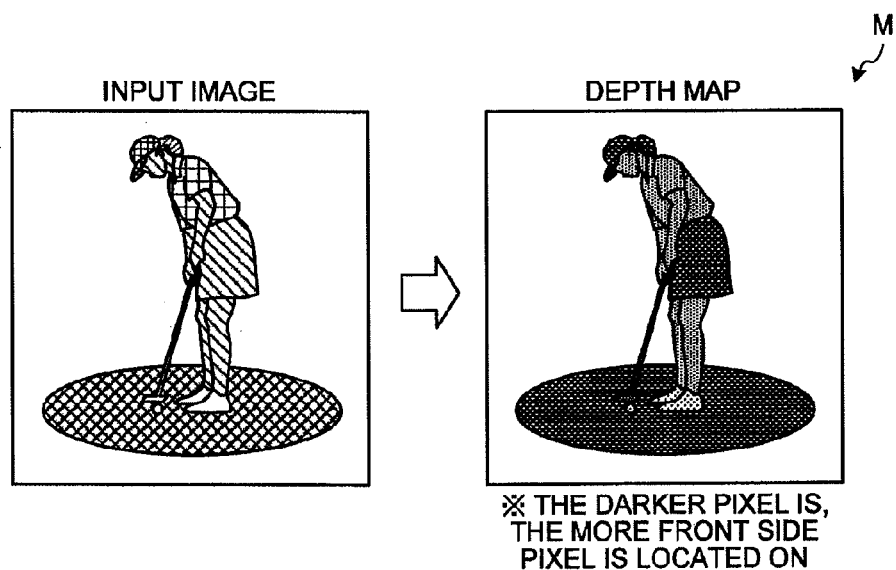
FIG. 13 is an exemplary schematic of a depth map in the embodiment.

Furthermore, after the interpolation, the depth interpolating module 177 outputs a depth map M in which the depth value of each of the pixels is represented by shading (gray scale) of the pixels to the right and left end depth corrector 163. FIG. 13 is a schematic of an example of the depth map M in the embodiment. As illustrated in FIG. 13, the depth map M is image data in which the depth is represented by the gray gradation, and the darker the pixel is, the more front side the pixel is located on.

Figure 14:
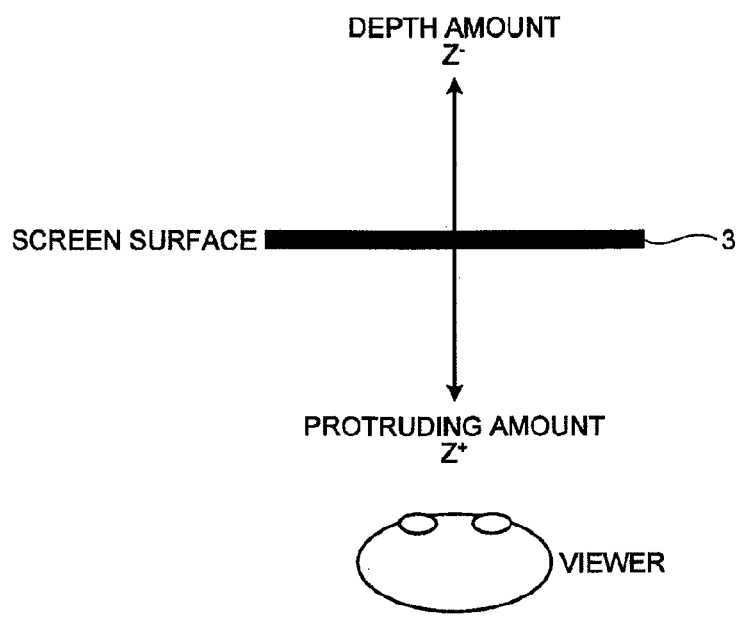
FIG. 14 is an exemplary view for explaining a concept of a protruding amount and a depth amount with respect to a screen surface in the embodiment.

Referring back to FIG. 5, the protruding amount/depth amount setting module 162 sets the protruding amount and the depth amount with respect to the screen surface of the LCD panel 3 input from the outside. FIG. 14 illustrates a concept of the protruding amount and the depth amount with respect to the screen surface in the embodiment. The screen surface of the LCD panel 3 illustrated in FIG. 14 is a surface that does not protrude forward and that does not recede rearward in stereoscopic viewing. The protruding amount and the depth amount with respect to the screen surface of the LCD panel 3 is not limited to the amounts input from the outside, and may be amounts set in advance in the protruding amount/depth amount setting module 162.

The right and left end depth corrector 163 corrects the depth values of pixels positioned within a predetermined distance from the right and left ends of the depth map M generated by the depth estimating module 161. The right and left end depth corrector 163 corrects each of the depth values so as to become closer to the depth value corresponding to the screen surface of the LCD panel 3 as the pixels are positioned closer to the ends.

Figure 15:
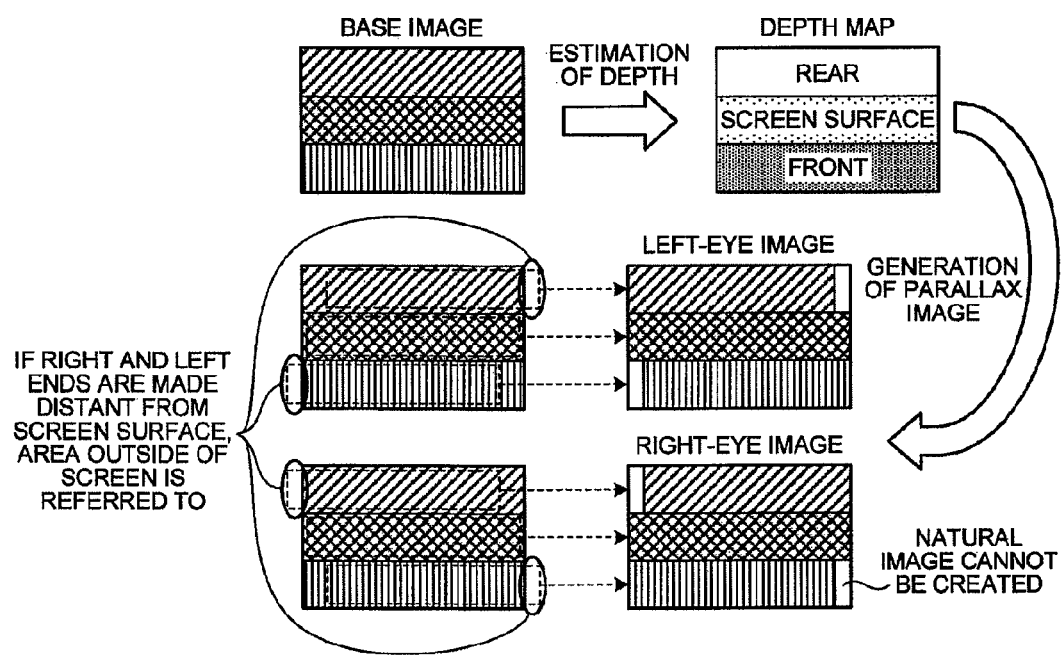
FIG. 15 is an exemplary view for conceptually explaining a problem in conventional generation of a parallax image.

The reason why the depth values on the right and left ends of the depth map M are corrected in this manner is as follows. In the conventional parallax image generation illustrated in FIG. 15, the pixels of a two-dimensional video are shifted in the horizontal direction based on the depth values, whereby a multi-parallax image (a right-eye video and a left-eye video) is generated. In this case, if the depth values on the right and left ends of the depth map M are made distant from the screen surface as illustrated in FIG. 15, the outside of the screen of the input image is referred to. However, because no pixel serving as a reference is present outside of the screen of the input image to be referred to, it is difficult to generate the parallax image properly. If the viewer views a stereoscopic video based on such a parallax image, the parallax image is inconsistent with other parallax images, and the ends of the screen appear to be broken.

An explanation will be made of right and left end depth correction processing performed by the right and left end depth corrector 163 to address such a problem described above with reference to the flowchart in FIG. 16. The flowchart in FIG. 16 illustrates a flow of depth correction processing on the left end of the depth map M output from the depth estimating module 161 in the embodiment.

Figure 16:
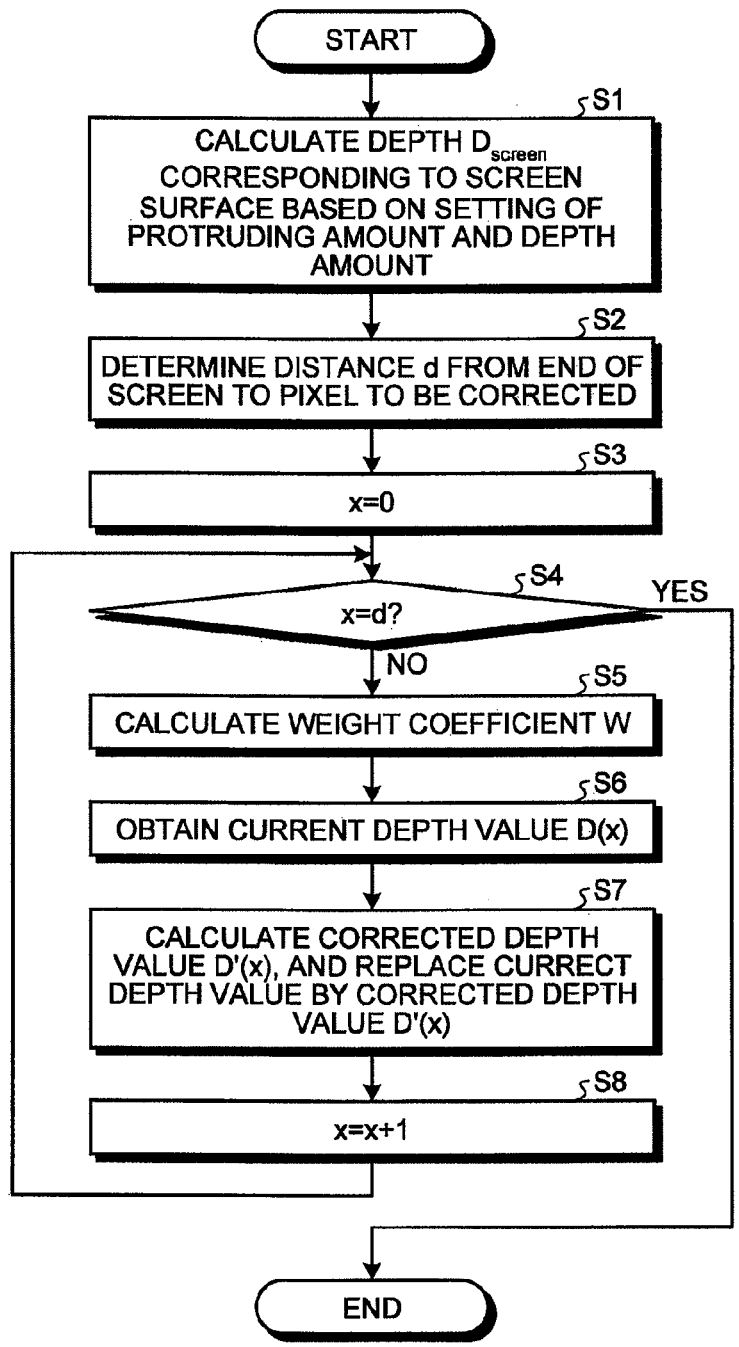
FIG. 16 is an exemplary flowchart of a flow of depth correction processing on the left side of the depth map in the embodiment.

As illustrated in FIG. 16, the right and left end depth corrector 163 calculates a depth value $D_{screen}$ corresponding to the screen surface of the LCD panel 3 based on the protruding amount and the depth amount set by the protruding amount/depth amount setting module 162 (S1). As illustrated in FIG. 17, given DMAX is the maximum depth value, $Z^+$ is the maximum protruding amount, and $Z^-+Z^+$ is the depth range, the depth value $D_{screen}$ corresponding to the screen surface of the LCD panel 3 is calculated by Equation (1):

$$D_{screen}=DMAX*Z^+/(Z^-+Z^+) \qquad (1)$$

Subsequently, the right and left end depth corrector 163 determines an arbitrary distance d from the end of the screen where the depth values of the pixels are to be corrected (S2). The target to be corrected by the right and left end depth corrector 163 is the right and left end portions of the depth map M output from the depth estimating module 161. It is required to set the distance d from the end of the screen of the depth map M to the pixel to be corrected to equal to or more than the maximum shift amount obtained when the parallax image generator 164 at the subsequent stage generates a parallax image.

The right and left end depth corrector 163 then initializes the number of pixels x (x=0) (S3), and repeats processing at S5 to S8 described below until the number of pixels x reaches the distance d to the pixel to be corrected (Yes at S4).

If the right and left end depth corrector 163 determines that the number of pixels x falls short of the distance d to the pixel to be corrected (No at S4), the right and left end depth corrector 163 goes to S5, and calculates a weight coefficient W. In the present embodiment, the weight coefficient W is linearly decreased within the distance d from the left end of the screen of the depth map M as illustrated in FIG. 18. In the present embodiment, linear weight is used as the weight coefficient W when correcting the depth value. However, it is not limited thereto, and another weighted curve may be used on condition that the outside of the screen is not referred to.

Subsequently, the right and left end depth corrector 163 obtains a current (before being corrected) depth value D (x) (S6). The right and left end depth corrector 163 then calculates a corrected depth value D' (x) by Equation (2), and replaces the depth value D (x) by the corrected depth value D' (x) (S7).

$$D'(x)=W*D_{screen}+(1.0-W)*D(x) \qquad (2)$$

The right and left end depth corrector 163 then increments the number of pixels x by one (S8), and goes to S4.

If the right and left end depth corrector 163 determines that the number of pixels x thus processed reaches the distance d (Yes at S4), the processing is terminated.

The depth correction processing described above is also performed on a pixel to be corrected on the right end of the depth map M.

By performing the processing described above, the right and left end depth corrector 163 generates a corrected depth map M'. The corrected depth map M' is obtained by correcting the depth values of pixels positioned within a predetermined distance from the right and left ends of the depth map M generated by the depth estimating module 161 so as to become closer to the depth value corresponding to the screen surface of the LCD panel 3 as the pixels are positioned closer to the ends.

Referring back to FIG. 5, the parallax image generator 164 generates a multi-parallax image for a stereoscopic video from the input image and the corrected depth map M'. In greater detail, the parallax image generator 164 shifts the pixels of the input image of the two-dimensional image by a predetermined amount in the horizontal direction based on the depth value of the corrected depth map M', thereby generating a multi-parallax image (a right-eye video and a left-eye video) for a stereoscopic video.

Figure 19:
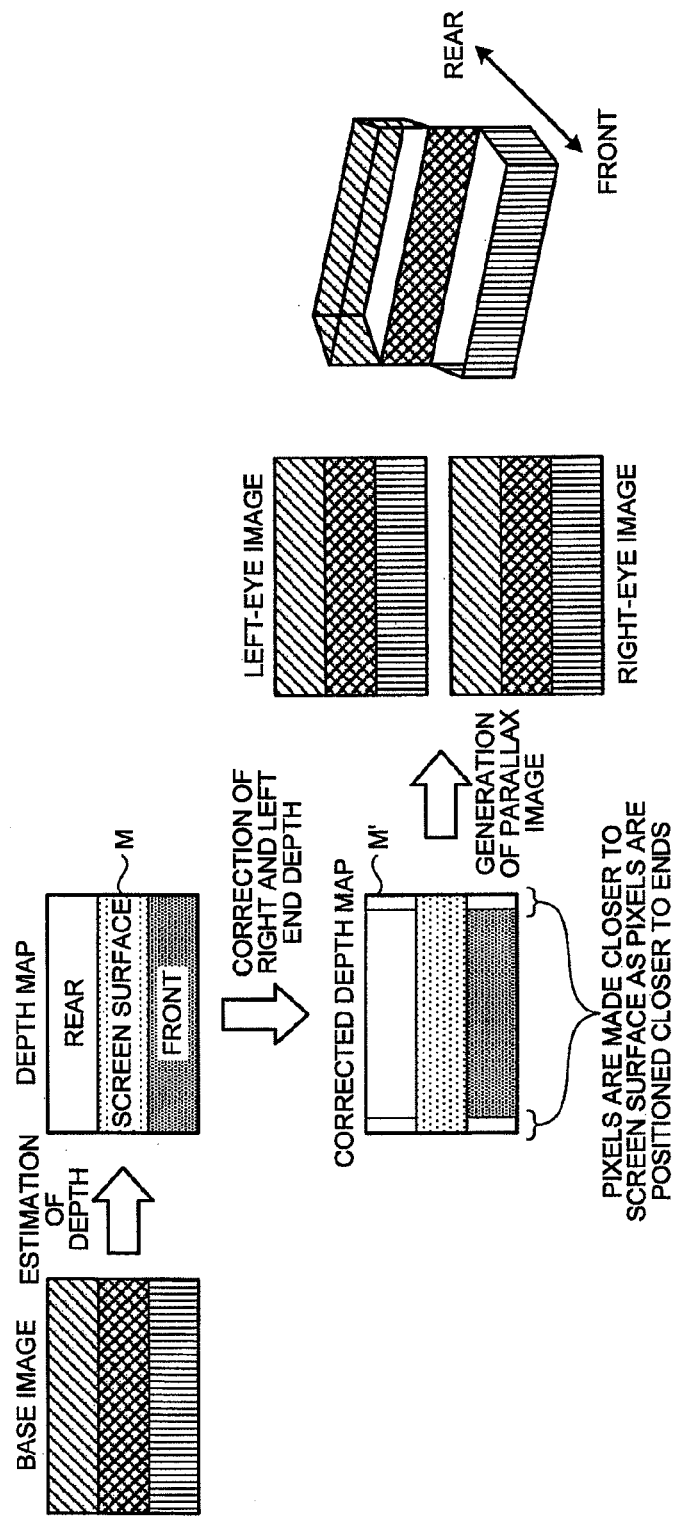
FIG. 19 is an exemplary view for schematically explaining an example of generation of a multi-parallax image for a stereoscopic video in the embodiment.

FIG. 19 is a view for schematically explaining an example of generation of the multi-parallax image for a stereoscopic video in the embodiment. As illustrated in FIG. 19, in the multi-parallax image for a stereoscopic video generated from the input image and the corrected depth map M', if the images on the right and left ends are located on the front side, the depth thereof is gradually added from the front side to the screen surface of the LCD panel 3. By contrast, if the images on the right and left ends are located on the rear side, the depth thereof is gradually added from the screen surface of the LCD panel 3 to the rear side. As a result, the multi-parallax image appears to have a quasi-frame.

As described above, the digital television 1 serving as a stereoscopic image output apparatus according to the present embodiment uses the corrected depth map M' obtained by correcting the depth within the predetermined distance from the right and left ends so as to become close to the depth value corresponding to the screen surface that does not protrude forward and that does not recede rearward in stereoscopic viewing. As a result, the depth values on the right and left ends of the input image are not made distant from the screen surface, whereby a multi-parallax image for a stereoscopic video can be generated without referring to the outside of the screen on the right and left ends of the input image. Therefore, it is possible to prevent the right and left ends of the multi-parallax image for a stereoscopic video generated by shifting the pixels of a base image depending on the parallax amount from being broken.

In the present embodiment, the processing for converting the video signal (input video) for ordinary planer view (two-dimensional) display into the video signal for stereoscopic (three-dimensional) display has been explained as the stereoscopic image conversion processing performed by the signal processor 16 of the digital television 1. However, the stereoscopic image conversion processing is not limited thereto. In other words, the depth estimating module 161 of the signal processor 16 also can generate a depth map by: using a video signal for stereoscopic (three-dimensional) display (that is, a two-parallax image (stereo image)) as an input video; and estimating the depth value in the screen based on the amount of characteristics (e.g., motions and colors) of the video signal (two-parallax image) for stereoscopic display. Furthermore, various types of video formats are applicable to such a video signal for stereoscopic display (two-parallax image). Examples of the video formats include the frame sequential method, the side by side method, and the top and bottom method. In the frame sequential method, a right-eye video and a left-eye video are displayed alternately in a time-division manner. In the side by side method, the screen is divided into a right and a left half, and a right-eye video is displayed on the right half and a left-eye video is displayed on the left half. In the top and bottom method, the screen is divided into a top and a bottom half, and a right-eye video is displayed on the bottom half and a left-eye video is displayed on the top half.

Figure 20:
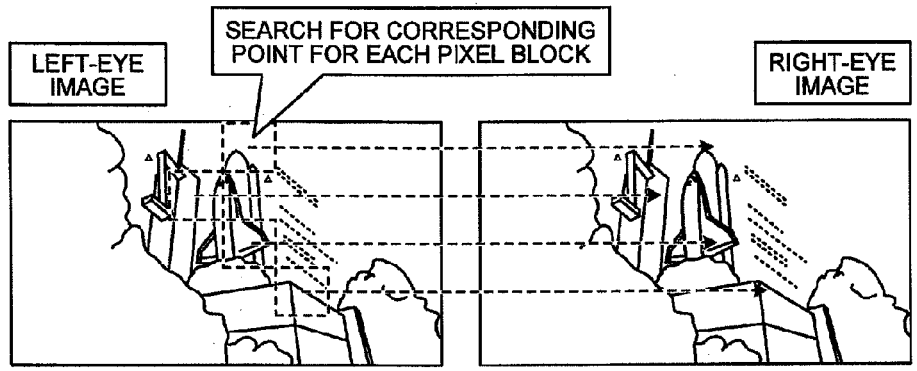
FIG. 20 is an exemplary view for explaining a method for searching for parallax from a video signal for stereoscopic display in the embodiment.
Figure 21:
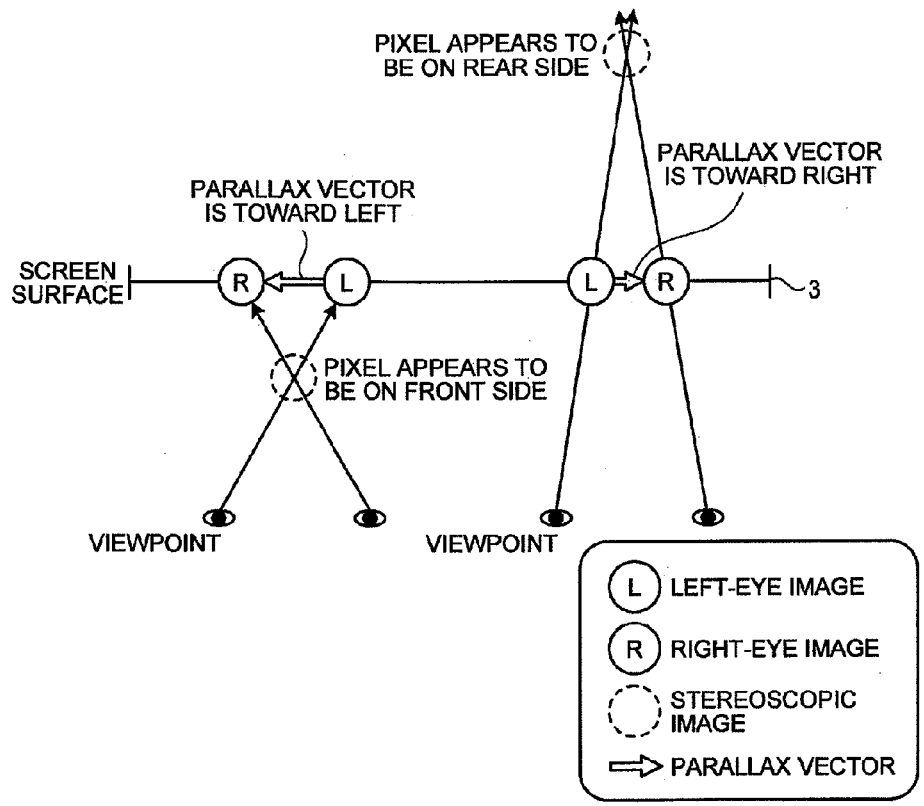
FIG. 21 is an exemplary view for explaining a method for converting a parallax vector into depth in the embodiment.

More specifically, as illustrated in FIG. 20, the depth estimating module 161 searches for a corresponding point from the left-eye image to the right-eye image in the video signal for stereoscopic display (two-parallax image) for each pixel block, thereby obtaining a parallax vector (stereo matching). Subsequently, as illustrated in FIG. 21, the depth estimating module 161 determines that the pixel having the parallax vector toward the left appears to be on the front side, and that the pixel having the parallax vector toward the right appears to be on the rear side. The depth estimating module 161 then generates the depth map M in which the depth value of each of the pixels is represented by shading (gray scale) of the pixels, and outputs the depth map M to the right and left end depth corrector 163.

In the digital television 1 and the pair of stereoscopic glasses 50 according to the present embodiment, the time-division display method is employed in which the right and left videos are displayed alternatively, and the liquid crystal shutters are controlled in synchronization therewith. However, the display method is not limited thereto. For example, a direct-view display method such as an Xpol method and a projection display method can also be employed. In the Xpol method, a polarizing lens polarizing in different directions for each scanning line is attached to the front surface of the video display, and a pair of polarizing glasses is used.

Furthermore, the stereoscopic image output apparatus according to the present embodiment is also applicable to a digital television in a glassless method. In such a digital television in the glassless method, a lenticular sheet is arranged on the screen surface of the LCD panel 3 instead of using the pair of stereoscopic glasses 50 and the pair of polarizing glasses.

In the present embodiment, the explanation has been made of the case where the stereoscopic image output apparatus is applied to the digital television 1. Alternatively, the stereoscopic image output apparatus may be applicable to an HDD recorder, a tuner, and a set-top box, for example.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   circuitry configured to;
   generate a first depth map comprising depth values of pixels of an input video, wherein the depth values are estimated based on an amount of a characteristic of the input video, and wherein the depth values are represented by pixel shading;
   set a protruding amount and a depth amount with respect to a screen surface of a display;

calculate the depth value corresponding to the screen surface of the display based on the set protruding amount and the set depth amount;

generate a second depth map by correcting the depth values of pixels within a first distance from each of right and left ends of the first depth map to become closer to the calculated depth value corresponding to the screen surface of the display that does not protrude forward or recede rearward in stereoscopic viewing as the pixels within the first distance are positioned closer to the each of the right and left ends of the first depth map; and generate a multi-parallax image by shifting pixels of the input video by an amount horizontally based on the depth values of the second depth map.

2. The electronic apparatus of claim 1, wherein the circuitry is configured to, based on the set protruding amount and the set depth amount, calculate the depth value corresponding to the screen surface of the display by Equation (1):

$$D_{screen}=DMAX*Z^+/(Z^-+Z^+) \qquad (1)$$

wherein $D_{screen}$ represents the depth value corresponding to the screen surface of the display, DMAX represents a maximum depth value, $Z^+$ represents a maximum protruding amount, and $Z^-+Z^+$ represents a depth range $Z^-+Z^+$.

3. The electronic apparatus of claim 1, wherein the circuitry is configured to set the first distance to equal to or more than a maximum shift amount obtained when the multi-parallax image is generated.

4. The electronic apparatus of claim 1, wherein the circuitry is configured to decrease a weight coefficient within the first distance from the each of ends of the each of right and left ends of the depth map, and to correct, by Equation (2), the depth values of the pixels within the first distance:

$$D'(x)=W*D_{screen}+(1.0-W)*D(x) \qquad (2)$$

wherein D'(x) represents a corrected depth value, W represents the weight coefficient, $D_{screen}$ represents the depth value corresponding to the screen surface of the display, and D(x) represents a depth value before being corrected.

5. An electronic apparatus comprising:

circuitry configured to:

encode a video signal;

generate a first depth map comprising depth values of pixels of an input video, wherein the depth values are estimated based on an amount of a characteristic of the input video, and wherein the depth values are represented by pixel shading;

set a protruding amount and a depth amount with respect to a screen surface of a display;

calculate the depth value corresponding to the screen surface of the display based on the set protruding amount and the set depth amount;

generate a second depth map by correcting the depth values of pixels within a distance from each of right and left ends of the first depth map to become closer to the calculated depth value corresponding to the screen surface of the display that does not protrude forward or recede rearward in stereoscopic viewing as the pixels within the distance are positioned closer to the each of the right and left ends of the first depth map;

generate a multi-parallax image by shifting pixels of the input video by an amount horizontally based on the depth values of the second depth map;

convert an encoded input video signal into a video signal for stereoscopic display;

convert the converted video signal for stereoscopic display into a video signal in a format for display on a display; and output the video signal.

6. A method comprising:

generating a first depth map comprising depth values of pixels of an input video, wherein the depth values are estimated based on an amount of a characteristic of the input video, and wherein the depth values are represented by pixel shading;

setting a protruding amount and a depth amount with respect to a screen surface of a display;

calculating the depth value corresponding to the screen surface of the display based on the set protruding amount and the set depth amount;

generating a second depth map by correcting the depth values of pixels within a first distance from each of right and left ends of the depth map to become closer to the calculated depth value corresponding to the screen surface of the display that does not protrude forward or recede rearward in stereoscopic viewing as the pixels within the first distance are positioned closer to the each of the right and left ends of the depth map; and generating a multi-parallax image by shifting pixels of the input video by an amount horizontally based on the depth values of the second depth map.

7. The method of claim 6, wherein generating a second depth map comprises, based on the set protruding amount and the set depth amount, calculating the depth value corresponding to the screen surface of the display by Equation (1):

$$D_{screen}=DMAX*Z^+/(Z^-+Z^+) \qquad (1)$$

wherein $D_{screen}$ represents the depth value corresponding to the screen surface of the display, DMAX represents a maximum depth value, $Z^+$ represents a maximum protruding amount, and $Z^-+Z^+$ represents a depth range $Z^-+Z^+$.

8. The method of claim 6, wherein generating a second depth map comprises setting the first distance to equal to or more than a maximum shift amount obtained when the multi-parallax image is generated.

9. The method of claim 6, wherein generating a second depth map comprises decreasing a weight coefficient within the first distance from the each of ends of the each of right and left ends of the depth map, and correcting, by Equation (2), the depth values of the pixels within the first distance:

$$D'(x)=W*D_{screen}(1.0-W)*D(x) \qquad (2)$$

wherein D'(x) represents a corrected depth value, W represents the weight coefficient, $D_{screen}$ represents the depth value corresponding to the screen surface of the display, and D(x) represents a depth value before being corrected.

* * * * *